United States Patent [19]
Higley

[11] Patent Number: 5,628,242
[45] Date of Patent: May 13, 1997

[54] GAS GRILL WITH AUTOMATIC SHUT OFF CONTROLLED BY DYNAMIC ACTIVITY SENSOR

[76] Inventor: John E. Higley, 14092 Harbor La., Palm Beach Gardens, Fla. 33410

[21] Appl. No.: 708,502

[22] Filed: Sep. 5, 1996

[51] Int. Cl.⁶ .................... A47J 37/00; F24C 3/00
[52] U.S. Cl. .................. 99/332; 99/337; 99/344; 99/400; 99/446; 126/25 R; 126/39 E; 126/41 R
[58] Field of Search ............... 99/325–336, 337, 99/338, 341, 344, 339, 340, 400, 401, 390, 444–446, 447, 450, 448, 481, 482; 126/25 R, 25 B, 39 E, 41 R, 39 BA, 9 R; 137/624.11, 624.12, 624.21; 251/11, 74, 129.1

[56] References Cited

U.S. PATENT DOCUMENTS

| | | | |
|---|---|---|---|
| H813 | 9/1990 | Ragon | 99/467 |
| 3,964,463 | 6/1976 | Dailey | 126/25 R |
| 4,295,028 | 10/1981 | Tanabe | 219/10.55 B |
| 4,441,480 | 4/1984 | Rickman et al. | 126/41 R |
| 4,557,139 | 12/1985 | Cantwell et al. | 73/40.7 |
| 4,686,958 | 8/1987 | Skelton et al. | 99/339 |
| 4,732,137 | 3/1988 | Parsons | 126/25 R |
| 4,760,836 | 8/1988 | Witzel | 126/42 |
| 4,781,170 | 11/1988 | Perl | 99/390 X |
| 4,823,838 | 4/1989 | Ferlin | 137/624.12 |
| 4,916,437 | 4/1990 | Gazzaz | 340/632 |
| 4,930,488 | 6/1990 | Pearman et al. | 126/39 E |
| 4,937,558 | 6/1990 | Robinet et al. | 340/606 |
| 5,003,960 | 4/1991 | Hanagan | 126/39 BA |
| 5,018,964 | 5/1991 | Shah | 431/45 |
| 5,033,449 | 7/1991 | Hanagan | 126/39 BA |
| 5,094,259 | 3/1992 | Hsu | 137/66 |
| 5,213,075 | 5/1993 | Stephen et al. | 126/25 B |
| 5,333,596 | 8/1994 | Clifford | 126/41 R |
| 5,445,066 | 8/1995 | Rosset | 99/446 |
| 5,458,294 | 10/1995 | Zachary et al. | 431/80 X |
| 5,544,685 | 8/1996 | Stieferman | 137/429 X |
| 5,546,851 | 8/1996 | Goto | 99/446 |

*Primary Examiner*—Timothy F. Simone
*Attorney, Agent, or Firm*—John C. Smith

[57] ABSTRACT

An activity monitor for a gas cooker or grill which monitors activity with a motion detector. When the grill has not been used for a preselected time period, the gas supply is automatically shut off to avoid fire hazard and/or wasting of fuel. An adjustable timer is used to activate the automatic shut off of the gas supply only after no motion has been detected for a preselected time period. A default timer value can be used when the grill is initially activated. If motion is detected prior to gas supply shut off, then the timer is reset to zero. Motion detection is accomplished by one or more methods including a lid position sensor to detect when the grill lid is moved between the open and the closed position a motion detector which monitors switch usage to detect activity, and vibration or movement monitors.

20 Claims, 8 Drawing Sheets

Prior Art

GAS GRILL WITH AUTOMATIC SHUT OFF CONTROLLED BY DYNAMIC ACTIVITY SENSOR

BACKGROUND OF THE INVENTION

1. Technical Field

The present invention relates to gas cooking units. In particular, it relates to automatic shutoff mechanisms for gas grills which reduce loss of fuel and improve safety by automatically shutting off the gas supply based on a preselected pattern of activity.

2. Background Art

The prior art has produced many types of gas cooking devices, such as outdoor barbeque (BBQ) grills, indoor grills, gas kitchen stoves, etc. Potential problems associated with gas fueled cooking devices (hereinafter collectively referred to as grills) are caused when a user forgets to turn off a grill after use. Forgetting to turn off a grill leads to both safety hazards and poor fuel economy.

The prior art has provided a number of devices related to safety. For example, it is known that flame detectors can be installed in a stove to detect if the flame has been extinguished. Once it has been determined that a flame is out, the gas supply is cut off. The purpose of this device is to prevent the situation where a flame inadvertently extinguishes, resulting in a build-up of gas and a subsequent explosion. This type of device is not useful for preventing fires which are caused by grills that are left unattended and continue to heat up until a fire is started.

Attempts to improve safety have included remote controlled ignition systems which allows a BBQ grill to be ignited with the grill lid closed. This safety feature is related to starting the grill and does not address the concerns related to grills which are inadvertently left on. A variation of this system prevents the grill from lighting if the lid is not closed.

It is also known to place gas leak detectors in kitchen stoves to prevent fire hazard when pilot lights are inadvertently distinguished.

While the prior art, as discussed above, has provided several solutions related to safety, it has not provided as much in the way of reducing inadvertent fuel loss. The safety systems which shut off gas supplies when the flame is inadvertently extinguished also save fuel as a side effect of their safety operation.

The foregoing prior art approaches are directed to problems which result from device malfunctions, such as loss of flame, flame detection, etc. They do not address the avoidance of problems which are caused by grills that are functioning correctly, but may cause problems due to being inadvertently left on by the user.

As a result, grills which are not malfunctioning, but which are inadvertently left on by a user, can cause fires by overheating the grill to the point where structures near the grill may be ignited. Likewise, if material is left in a grill by a user, that material may ignite and subsequently cause nearby structures to ignite due to overheating.

In addition to the safety hazards associated with unattended grills, the unattended operation of a grill also results in an economic cost to the user. It would be desirable to have a grill which could determine when a user is finished using the grill and automatically turn off the grill.

While the prior art has provided solutions related to safer operation of gas fueled grills, it has concentrated on detecting grill malfunctions such as flame out, gas leakage, etc, and avoiding problems caused by the malfunctions. Likewise, solutions provided by the prior art have been directed to remote ignition of grills to avoid injuries in the event of an explosion when the user is just beginning to use the grill. While, these solutions address the consequences of device malfunction, such as temporary loss of flame, gas leaks, etc., they have failed to provide a device which can avoid fire hazards and unnecessary fuel loss when the grill is not malfunctioning. In particular, the prior art has failed to provide a device which can determine, based on pattern of use, that a properly functioning grill has been inadvertently left on and then shut off the gas supply to avoid fire or fuel loss before they happen.

SUMMARY OF THE INVENTION

The present invention solves the foregoing problems by providing a device which monitors grill usage by using an activity detector. When the activity detector indicates that the grill has not been used for a preselected time period, the gas supply is automatically shut off to avoid fire hazard and/or wasting of fuel. An adjustable timer is used to activate the automatic shut off of the gas supply only after no activity has been detected for a preselected time period. A default timer value can be used when the grill is initially activated. If activity is detected prior to gas supply shut off, then the timer is reset to zero. One activity detector embodiment uses a lid position switch to detect when the grill lid is moved between the open and the closed position. Another activity detector embodiment monitors switch usage to detect activity. A third activity detector embodiment monitors for vibration or movement of the grill to detect activity.

DESCRIPTION OF THE PREFERRED EMBODIMENT

Prior to a discussion of the preferred embodiment of the invention, it should be understood that while the features and advantages of the invention are illustrated in terms of an outdoor BBQ grill, the invention can be used with any type of gas cooking device, such as outdoor portable BBQ grills, outdoor permanent BBQ grills, indoor gas grills, and conventional residential or commercial kitchen stoves.

Figure 1:
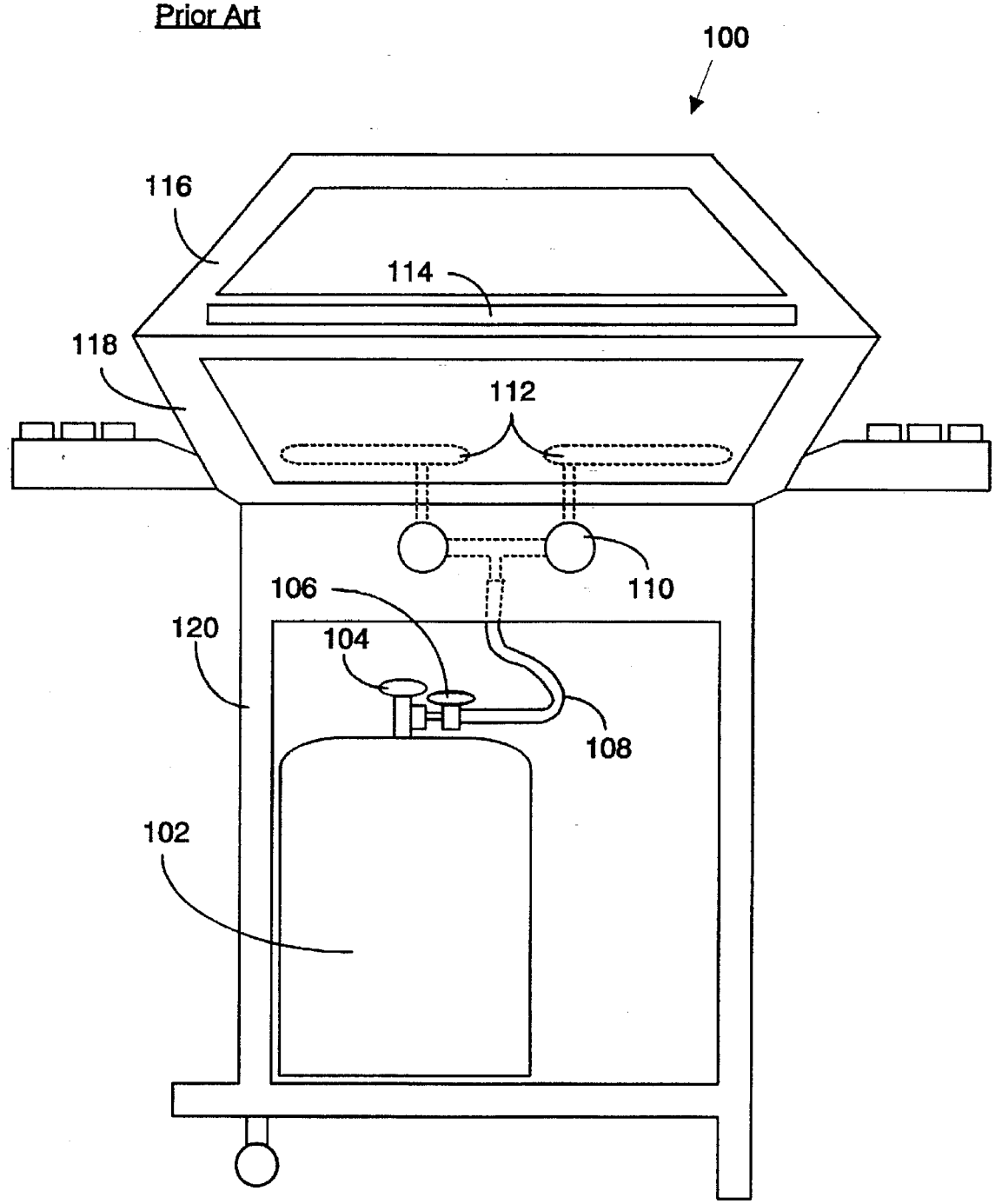
FIG. 1 illustrates a prior art BBQ grill.

Referring to FIG. 1, this figure shows a prior art gas BBQ grill 100. A typical gas grill 100 includes a fuel supply tank 102 which has an integrated shut off valve 104. The output of shut off valve 104 is attached to pressure regulator 106 which maintain stable gas pressure in fuel hose 108. The output of fuel hose 108 is input to one or more temperature control valves 110 which control fuel flow to burners 112. Lid 116, shown in the closed position, is attached to grill body 118 and is lifted to the open position by handle 114. Burners 112, and portions of temperature control valves 110 and fuel hose 108 are illustrated in dashed lines to indicate their locations inside of support frame 120 and grill body 118.

The basic grill 100 has is inexpensive to manufacture and provides convenience to the user. However, several disadvantages accrue from its simplicity. When a user finishes cooking, the food may be taken in several trips to another outdoor area or even indoors for consumption. Due to its remote location from the users, it is easy for a user to forget that grill 100 has been left on. When this happens, the burners 112 will typically continue to burn until the fuel supply tank 102 is empty. While a user would typically be able to use a single tank of fuel to prepare several meals, the inadvertent burning of fuel will result in as much as an entire tank of fuel being wasted for a single meal.

A more serious problem than the expense of wasting fuel is the safety hazard this presents. When a gas grill 100 is left on, it continues to heat. Depending on the location of grill 100, it may lead to ignition of surrounding material such as foliage, etc. In turn, substantial property damage may result from the ensuing fire. In addition, even if a fire does not occur, grill 100 will remain at dangerously hot temperatures. In the event a child, an animal, or even a careless adult comes in contact with the grill 100, serious burns may occur.

Those skilled in the art will recognize that while outdoor gas grills 100 may present a fire hazard, indoor gas heated kitchen stoves can be even more dangerous since an indoor fire may lead to destruction of the user's residence. In the case of elderly individuals, who may suffer from poor memory or senility, it is easy for them to forget that a stove may have been left on. The resulting fire may kill them and others who dwell in the same building. Therefore, the absence of a way to detect when a user has finished using the grill 100 or similar indoor devices exposes users to both dangerous risk of fire and to unnecessary expense.

Figure 2:
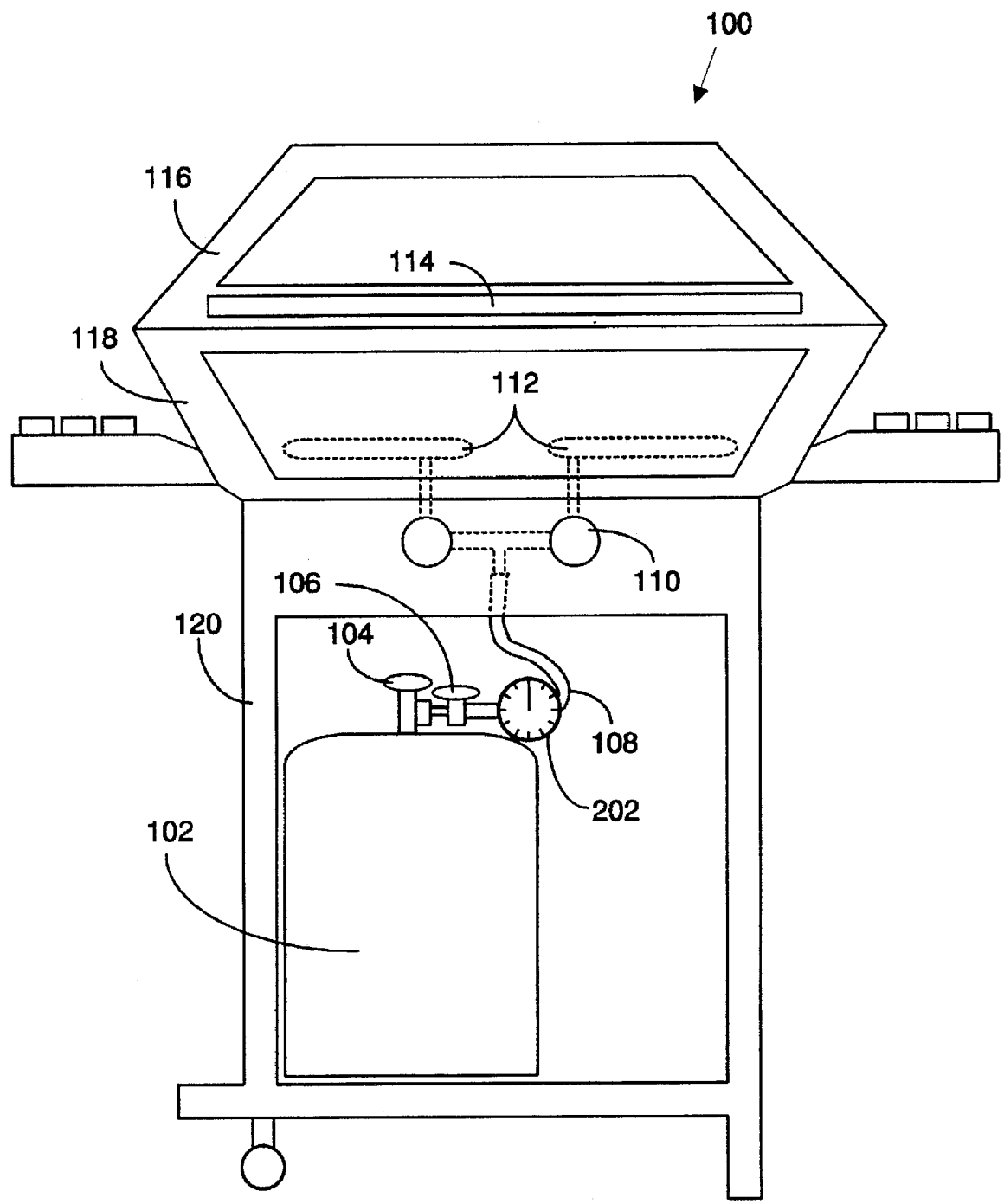
FIG. 2 is a preferred embodiment of the invention which uses an adjustable time controlled valve to shut off fuel automatically.

In FIG. 2, a preferred embodiment which uses a time controlled valve is shown. In this embodiment, an adjustable time controlled valve 202 is located in the fuel path between the pressure regulator 106 and the fuel hose 108. The user must set the time controlled valve 202 to the desired amount of cooking time based on the expected cooking time for the type of food being prepared. This embodiment requires that the user estimate activity prior to preparing the food. If the user has underestimated the cooking time, the user can adjust the remaining time. Likewise, if the user finishes cooking earlier than expected, the time controlled valve 202 can be turned off by the user.

A primary difference between this basic embodiment and the other embodiments discussed herein is that the user is forced to estimate activity time prior to beginning to cook. In the other embodiments, activity is automatically monitored by the grill, and the timer is dynamically adjusted based on the presence of monitored activity.

Figure 3:
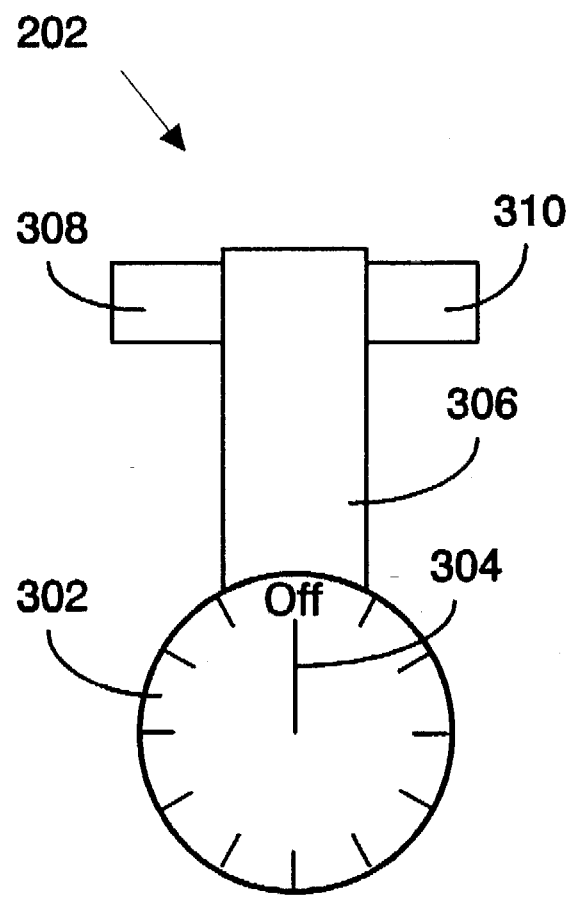
FIG. 3 is a more detailed view of the time controlled valve of FIG. 2.

FIG. 3 shows a detailed view of the adjustable time controlled valve 202. This embodiment uses a mechanical spring driven gas valve 306. When a user turns on grill 100, knob 304 is turned from the off position (as shown in the figure) to the desired amount of cooking time as indicated by the indicia on time scale 302. When knob 304 is in the off position, gas valve 306 is closed. When knob 304 is moved to a cooking time, it slowly returns to the off position by action of the internal spring (not shown). Spring driven timers are well known in the clock art.

Input port 308 is attached to the output of regulator 106, and output port 310 is attached to fuel hose 108. In the preferred embodiment, threaded metal gas fittings are used. However, those skilled in the art will recognize that any suitable gas line attachment can be used which complies with the appropriate government laws regarding fuel lines. For example, adjustable time controlled valve 202 can be integrated with regulator 106 or with fuel hose 108.

For ease of illustration, adjustable time controlled valve 202 is shown as a mechanical device. However, it can just as easily be implemented as an electronic timer which controls a battery operated solenoid valve. Of course, whether the adjustable time controlled valve 202 is entirely mechanical or is an electronically controlled device, the user can turn off the gas flow by rotating knob 304 to the off position or otherwise resetting the electronic timer if one is used.

Figure 4:
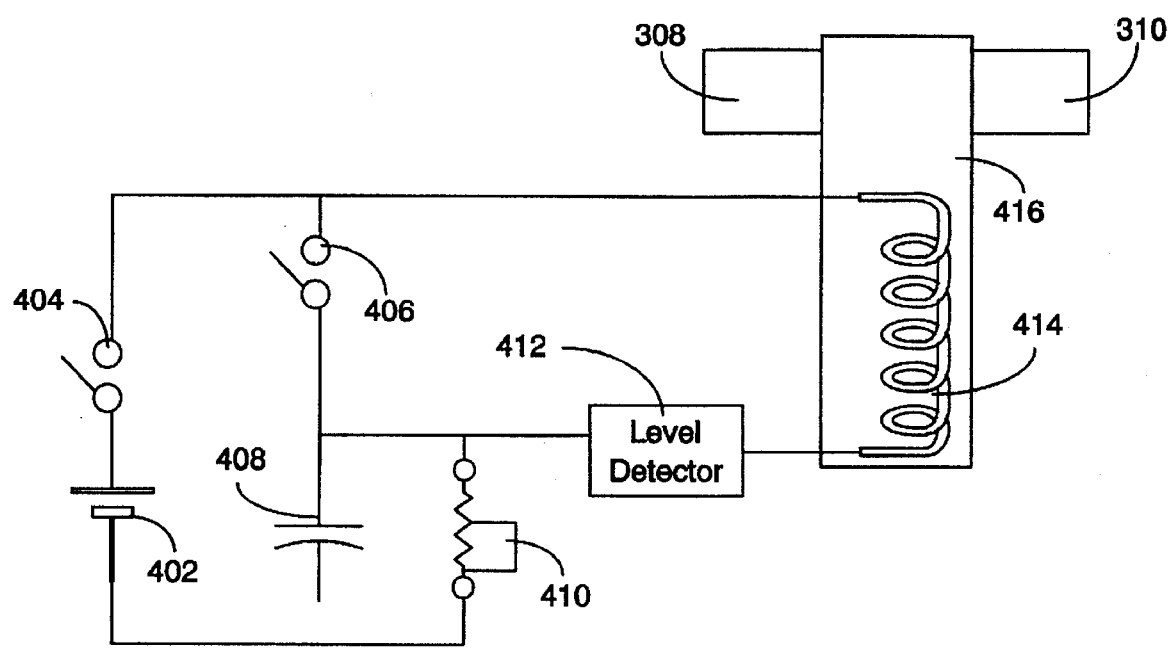
FIG. 4 is an alternative embodiment of the mechanical valve illustrated in FIG. 3. This embodiment uses a solenoid which is controlled by an electronic timer.

FIG. 4 shows an alternative embodiment which uses an electronic time controlled valve 416. Solenoid 414 allows gas to flow only when energized by the level detector 412. Power is supplied by a battery 402 or other external DC power source. When the user opens on/off switch 404, the battery 402 is disconnected to manually shut off solenoid 414 which in turn shuts off the gas supply.

During use, when on/off switch 404 is closed to provide power from battery 402 to the circuit. When activity is detected, activity switch 406 charges a time delay circuit consisting of capacitor 408 and variable resistor 410. Adjusting variable resistor 410 controls the discharge rate of capacitor 408. When the activity switch 406 allows the time delay circuit 408, 410 to charge, the time delay circuit 408, 410 provides a control voltage to level detector 412. As long as the control voltage is above a predetermined minimum, level detector 412 keeps the solenoid 414 energized and the gas flowing. As the normal voltage decay occurs in the time delay circuit 408, 410, the control voltage will decline until it drops below the minimum amount required by level detector 412 to hold the solenoid 414 energized. By adjusting the variable resistor 410, the amount of voltage decay time is adjusted which thereby adjusts the amount of time available for cooking before the gas supply is shut off.

For ease of illustration, the foregoing embodiment was illustrated in terms of a simple switch 402 which is used to close the path between the timer circuit 408, 410 and the battery 402. However, switch 406 can be implemented such that it dynamically recharges timer circuit 408, 410. For example, while switch 406 can be activated by a manually operated push button, it can also be activated by a motion detector, a lid up/down switch, etc. By using an activity switch 406 which is closed by user activity, the timer circuit 408, 410 will be recharged dynamically, without requiring user intervention.

This provides a convenience to the user for two reasons. First, the user will not have to worry about forgetting to manually operate activity switch 406. This avoids the situation where grill 100 is inadvertently shut off due to user forgetfulness. Second, the dynamic recharging of the timer circuit 408, 410 results in automatic shut down of the grill 100 when the period of inactivity set by the user is detected.

Therefore, the dynamic activity monitoring provided by this invention does not inconvenience the user by requiring the user to manually close activity switch 406 to recharge the timer circuit 408, 410 and it simultaneously ensures that the user will not forget to shut down grill 100 when cooking is complete.

While dynamic activity monitoring provides convenience and safety for anyone who uses gas fuel for cooking, it is especially valuable for indoor cooking units where fire may create more dangerous hazards for the particular user or others in the building. Further, there is one class of individual, namely those who are more prone to forgetfulness, such as the elderly or those suffering from memory effecting diseases such as Alzheimer's who are more prone than others to the risk of fire due to inadvertently forgetting to shut off kitchen stoves.

The foregoing problem can be easily addressed through the use of the invention with indoor cooking devices such as kitchen stoves. For example, a door position sensor can be used in conjunction with a kitchen oven door in much the same manner as the lid position sensor 602 (discussed more fully below in regard to FIGS. 6A-D) is used on outdoor BBQ grills 100. Likewise, vibration or motion detectors can be used in conjunction with burner units mounted on top of a kitchen stove to detect lack of activity. By adding the features and advantages of the invention to indoor grills such as kitchen stoves, the user and other residents of the building will be at a reduced risk to fire hazard.

Figure 5:
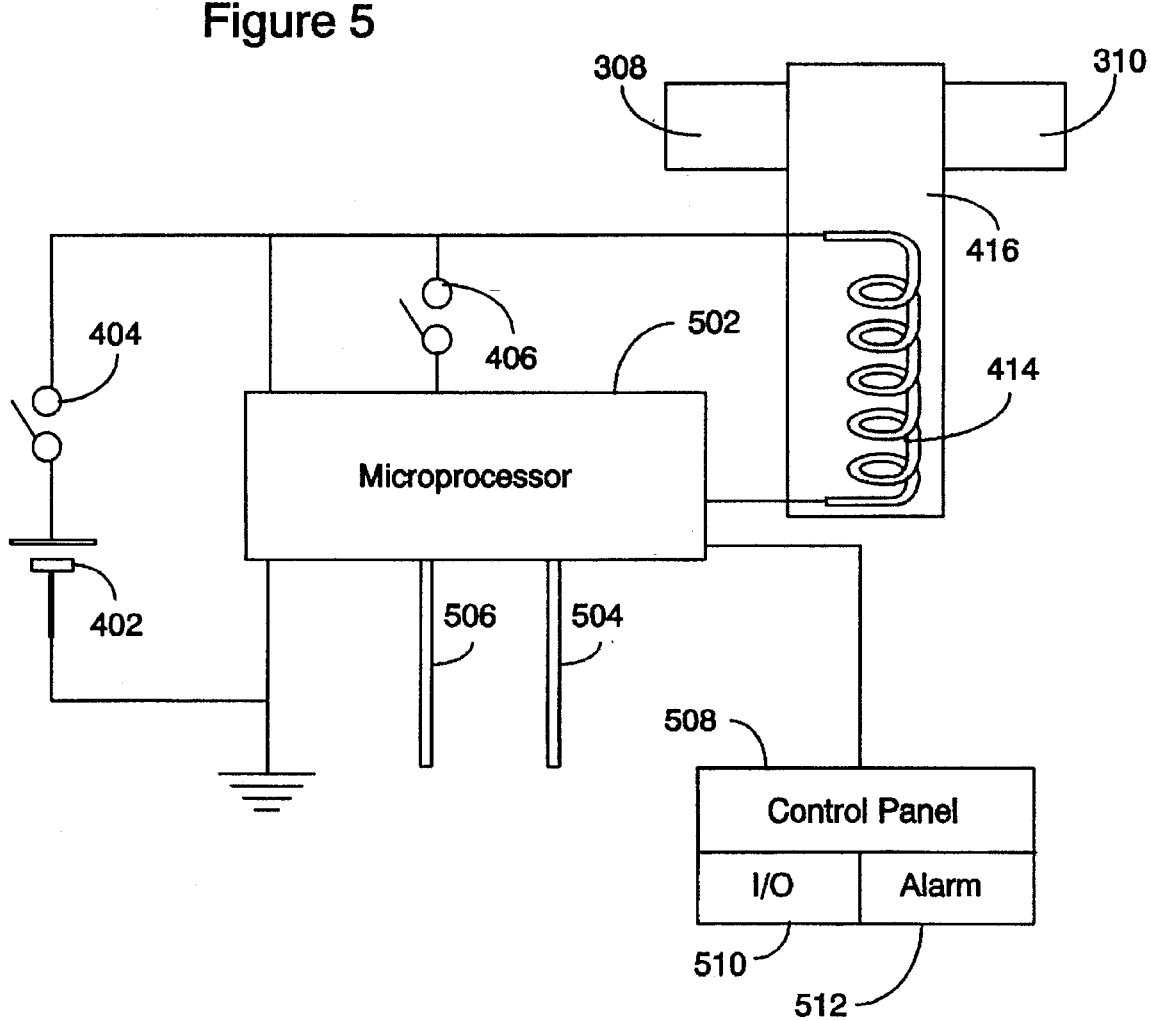
FIG. 5 is an alternative embodiment in which a microprocessor controls the grill. A control panel is used to operate the microprocessor which uses a variety of sensors to determine when to shut off the gas supply.

FIG. 5 shows an alternative embodiment which is microprocessor controlled. In this embodiment, microprocessor 502 controls solenoid 414 in gas valve 416. Power for microprocessor 502 and solenoid 414 is supplied by battery 402 under control of on/off switch 404. The functions of timer circuit 408, 410, discussed above in regard to FIG. 4, are implemented in this embodiment by microprocessor 502. Control panel 508 allows the user to input parameters such as initial cooking time, type of activity sensor to be used, amount of time to be used as the default time delay value, etc. The control panel 508 in the preferred embodiment has I/O 510 which includes both input entry means and display means to display user entries and information such as remaining time to shut off, etc. Control panels are well known in the art. Activity switch 406 also operates in this embodiment in the same manner as it did in the embodiment of FIG. 4. An advantage of using a microprocessor 502 instead of the simpler control mechanisms, discussed above, is that a variety of other user conveniences can be provided.

An optional alarm 512 is shown as part of control panel 508 for convenience. In practice, alarm 512 can be incorporated into control panel 508, built as a separate unit, integrated with the microprocessor 502, etc. In the preferred embodiment, alarm 512 will be activated prior to shut off of the gas supply to allow a user the opportunity to reset the timer circuit if desired without interrupting the operation of the gas grill 100.

As an example, microprocessor 502 can be used to control a variety of sensor devices, such as an oven temperature probe 506 used to monitor the internal grill temperature, or a food temperature probe 504 used to monitor the temperature of the food being cooked. The advantage of using an oven temperature probe 506 and/or a food temperature probe 504 is that the microprocessor 502 can precisely and automatically control cooking time and temperature in addition to providing the safety and economy advantages previously discussed. When the microprocessor 502 determines that the cooking process is complete for a particular type of food, the grill 100 can be automatically shut off by microprocessor 502 by closing adjustable time controlled valve 416. In addition, the microprocessor 502 can activate an alarm 512 to alert the user that the food is prepared. The alarm 512 can be implemented as a component of the control panel 508.

For ease of illustration, the term microprocessor is used herein to describe the control device. However, those skilled in the art will recognize that any intelligent device, such as a processor, a microprocessor, a controller, etc. can be used. Therefore, the term microprocessor, as used herein, includes any intelligent device capable of performing the functions of the invention.

Figure 6A:
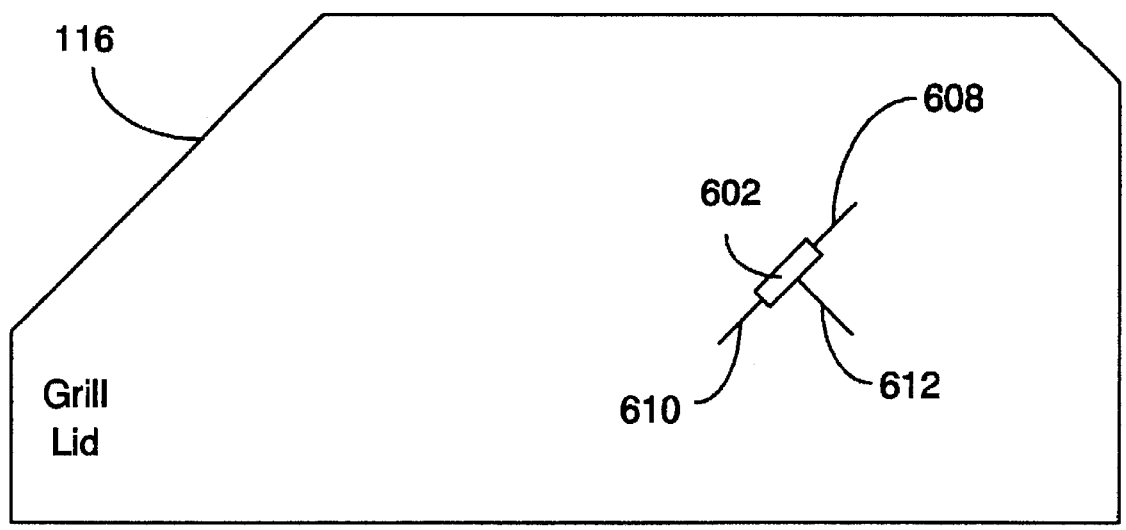
FIG. 6A illustrates a lid position sensor mounted on the side of a closed grill lid.
Figure 6B:
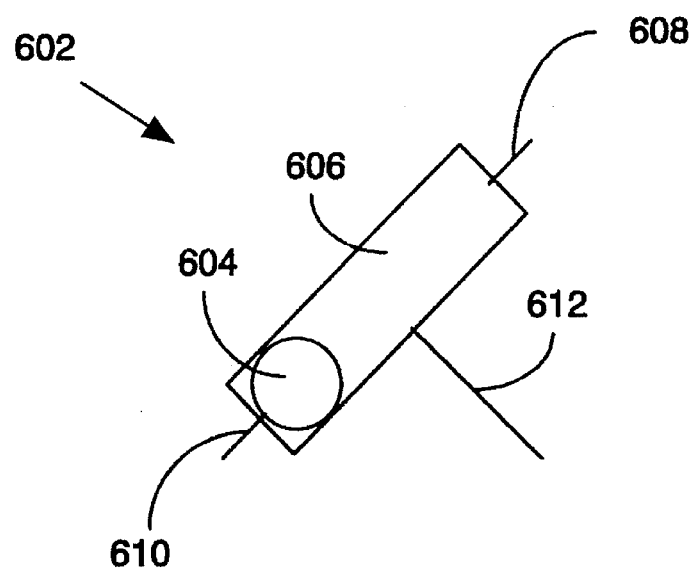
FIG. 6B is a close up view of the lid position sensor shown in FIG. 6A.

FIG. 6A illustrates a preferred embodiment of a lid position sensor 602 mounted on the side of a grill lid 116. In this embodiment, lid position sensor 602 is mounted at approximately a forty five degree angle on the side of grill lid 116. This mounting position permits the switch to indicate when the grill lid is in the up (open) or down (closed) position. However, the position of the lid position sensor 602 is not critical so long as it is capable of indicating when the grill lid 116 has been moved between the open and closed positions. When the grill lid 116 is closed, an electrical voltage supplied by line 612 is output on line 610. When the grill lid 116 is opened, an electrical voltage supplied by line 612 is output on line 608. Lid position sensor 602 acts as an activity monitor by detecting when grill lid 116 is closed by monitoring line 610 and detecting when grill lid 116 is opened by monitoring line 608. As a result, any movement of grill lid 116 indicates user activity. The output voltage on lines 610 or 608 can be used to activate activity switch 406 or be used in place of a physical activity switch 406 when it is input to microprocessor 502. In fact, activity switch 406 can be implemented in software within microprocessor 502 which responds to the voltage levels on lines 608, 610. FIG. 6B is a close up view of the lid position sensor 602 shown in FIG. 6A. This embodiment of lid position sensor 116 uses a cylinder 606 which has an electrically conductive inner cylinder wall. Line 612 is attached to cylinder 606 and is electrically connected to the conductive inner wall of cylinder 606. Lines 608 and 610 are attached to cylinder 606 such that they are isolated from the electrically conductive inner wall of cylinder 606 and extend into cylinder 606. The ends of lines 608 and 610 which extend into cylinder 606 are electrically conductive. An electrically conductive ball 604 rolls freely within cylinder 606. When grill lid 116 is in the closed position, ball 604 rolls into line 610 and completes the circuit between line 612 and line 610 as shown. Voltage from line 612 is output on line 610. The appearance or disappearance of voltage on line 608 is interpreted as movement of grill lid 116 and indicates activity. Known techniques which recognize the change in state of the output of line 610 can be used to implement activity switch 406.

Figure 6C:
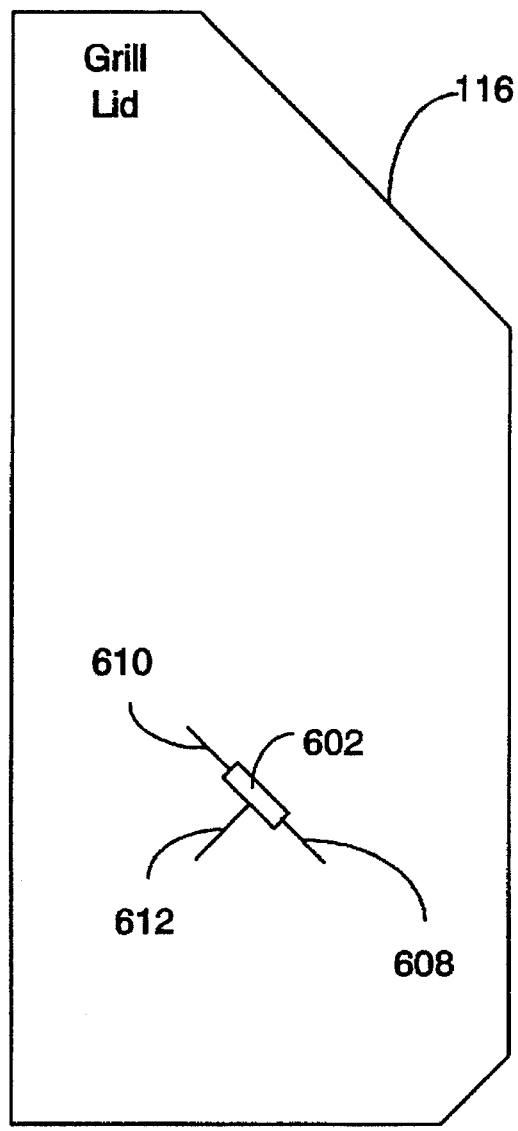
FIG. 6C illustrates a lid position sensor mounted on the side of an open grill lid.

FIG. 6C illustrates the grill lid 116 and lid position sensor 602 when the grill lid 116 is in the open position. In this position the voltage from line 612 is output on line 608.

Figure 6D:
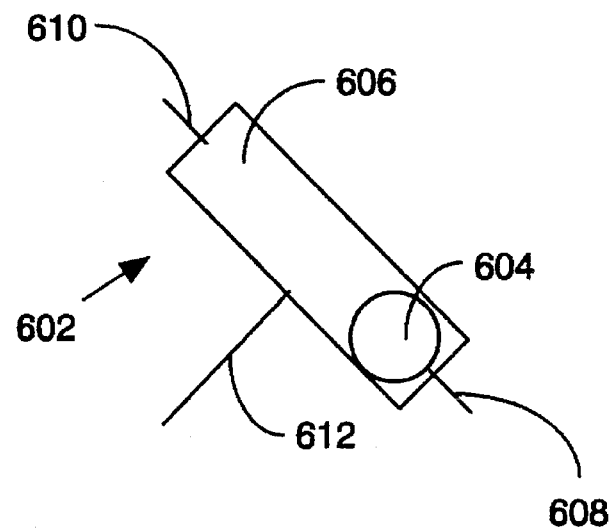
FIG. 6D is a close up view of the lid position sensor shown in FIG. 6C.

FIG. 6D is a close up view of the lid position sensor 602 in FIG. 6C. When the grill lid 116 is in the open position, ball 604 rolls to the end of cylinder 606 which is entered by line 608. Ball 604 completes the circuit between line 612 and line 608. A change in the state of line 608 is used to indicate activity in the same manner as a change in state of line 610 was used in the discussion of FIG. 6A and 6B.

Those skilled in the art will recognize that by detecting a state change, movement of grill lid 116 can be detected with a single line, either 608 and 610. Therefore, the invention does not require both lines 610, and 608. Likewise, this switch embodiment is exemplary only, since there are a variety of alternative switch mechanisms, such as mercury switches, reed switches, etc., which can accomplish the same function. In addition, alternative devices, such as vibration detectors can be used to indicate activity in place of a lid position sensor 602. Activity switch 406 can in fact be a vibration detector which produces an output (i.e. closes the switch) when vibration or motion is detected.

Figure 7:
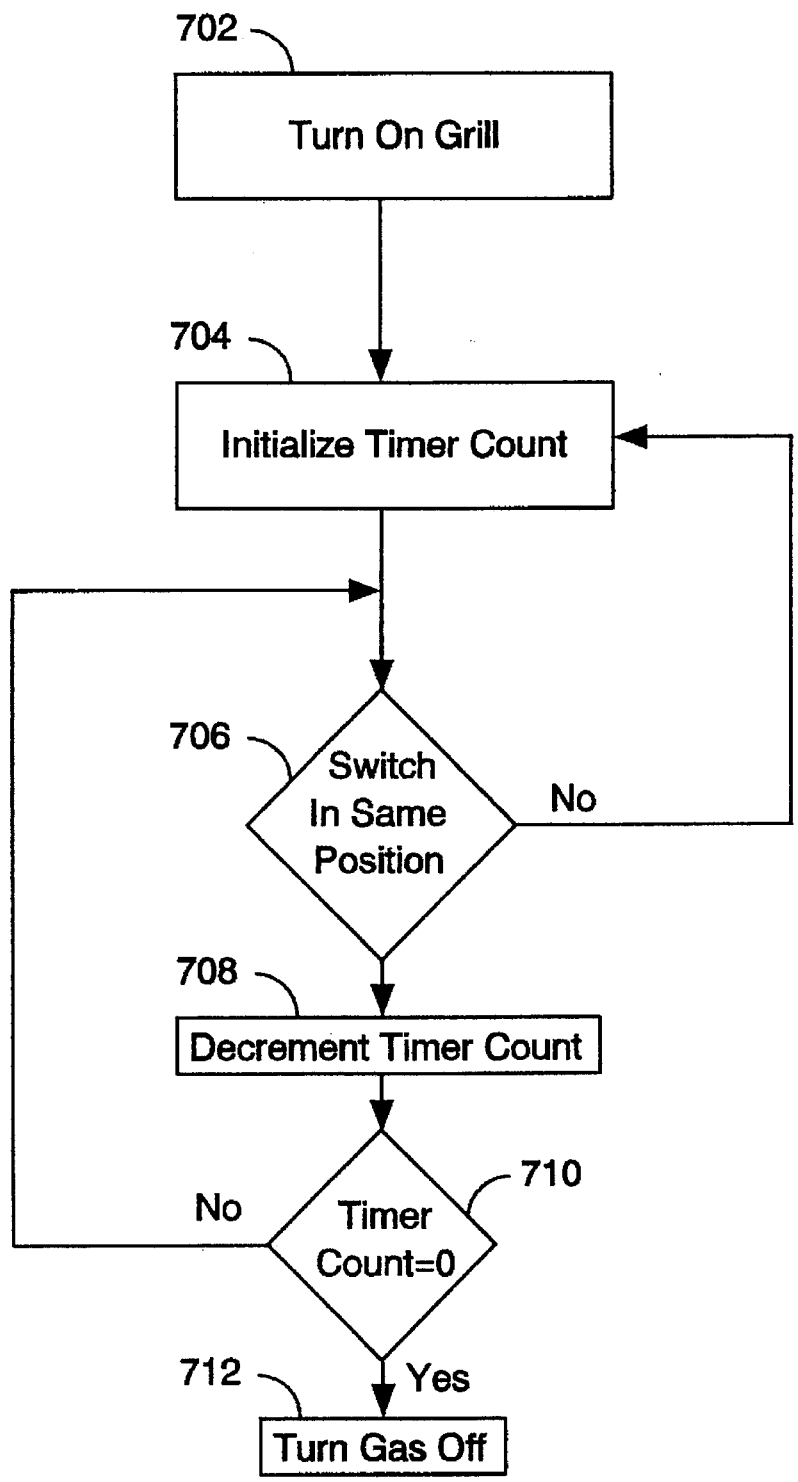
FIG. 7 is a flowchart which illustrates the dynamic activity monitoring process used by the invention.

FIG. 7 is a flowchart which illustrates the process used by the invention to dynamically and automatically monitor grill activity. Step 702 occurs when the user starts the grill 100. When the grill 100 is turned on, the timer is initialized in step 704. Once the timer is initialized in step 704, the activity switch is monitored in step 706. If activity is detected, then the timer at step 704 is reset. If no activity is detected then the timer is decremented at step 708 until it decrements to zero at step 710. Once the timer value equals zero, the gas supply is shut off at step 712.

The foregoing discussion has provided preferred embodiments of a dynamic gas supply shut off system which ensures that a gas grill is not left on unattended. As a result, unnecessary fuel loss is avoided. More importantly, the user's safety is improved by eliminating the risk of fire hazard caused by gas cooking devices which have been inadvertently left on. The invention can be implemented in several embodiments, ranging from simple mechanical timers to complex processor controlled systems which control the basic functions of the invention along with sophisticated cooking functions.

An important advantage of the dynamic activity monitoring provided by the invention is that it eliminates the hazards and expense of inadvertently leaving a grill 100 on while at the same time dynamically adjusting to a user's changing use of grill 100 without requiring user intervention or action. For example, in a system which has a fixed or preset amount of cooking time, the user must manually reset the grill 100 to alter usage patterns. The invention allows to user the convenience to continuing to cook when plans change (for example, when unexpected guests arrive) without having the grill 100 turn off. Therefore, the user can cook as long as desired and the grill 100 is shut off only after the user's activity stops.

The invention was described in terms of a typical outdoor BBQ grill. However, it should be understood that the invention can be used just as effectively with any type of gas cooking device. As mentioned above, an indoor kitchen stove, either commercial or residential, can benefit from the safety and economic advantages of the invention. A kitchen stove equipped with a motion or vibration detector can also be used to detect activity, and can even be used in combination with a lid position sensor. Likewise, the lid motion sensor 602, discussed above, can easily be implemented on an oven door.

While the invention has been described with respect to a preferred embodiment thereof, it will be understood by those skilled in the art that various changes in detail may be made therein without departing from the spirit, scope, and teaching of the invention. For example, a variety of activity switches can be used, multiple switches can be used, etc. Accordingly, the invention herein disclosed is to be limited only as specified in the following claims.

I claim:

1. A dynamic activity monitor and gas supply shut off for a gas grill, comprising:

timer means;

a gas supply shutoff valve, further comprising:

a gas input for inputting gas from a gas grill gas supply;

a gas output for outputting gas to a gas grill;

a gas shut off valve having an open position and a closed position and located between the gas input and gas output, the gas shut off valve controlled by the timer means such that the gas shut off valve is closed when the timer means times out;

an activity sensor having an output which indicates when cooking activity is detected, the output of the activity sensor is input to the timer means; and the timer means further having an input for inputting the output of the activity sensor, the timer means further having means to re-initialize when the output of the activity sensor indicates that activity is detected;

whereby the gas supply remains on for a predetermined period of time after activity is sensed and is automatically shut off when activity is not sensed for a predetermined period of time.

2. A device, as in claim 1, wherein the activity sensor is a lid position sensor.

3. A device, as in claim 2, wherein the gas shut off valve is moved between the open and closed positions by a solenoid.

4. A device, as in claim 3, further comprising:

a microprocessor, the microprocessor performing the functions of the timer means; and a control panel having means to input instructions to the microprocessor.

5. A device, as in claim 4, wherein the microprocessor performs the functions of the timer means.

6. A device, as in claim 5, further comprising:

a grill; and a gas supply.

7. A device, as in claim 6, further comprising:

a grill temperature probe having an output which indicates the temperature inside a grill, the output of the grill temperature probe is input to the microprocessor;

the microprocessor having means to control the internal temperature of the grill or the cooking time based on the temperature detected by the grill temperature probe.

8. A device, as in claim 7, further comprising:

a food temperature probe having an output which indicates the temperature of food inside a grill, the output of the food temperature probe is input to the microprocessor;

the microprocessor having means to control the internal temperature of the grill or the cooking time based on the temperature detected by the food temperature probe.

9. A device, as in claim 8, wherein the activity sensor further comprises an vibration sensor.

10. A device, as in claim 6, further comprising:

an alarm attached to the microprocessor;

the microprocessor having means to activate the alarm prior to shut off of the grill.

11. A device, as in claim 1, wherein the activity sensor is a vibration sensor.

12. A device, as in claim 11, wherein the gas shut off valve is moved between the open and closed positions by a solenoid.

13. A device, as in claim 12, further comprising:

a microprocessor, the microprocessor performing the functions of the timer means; and a control panel having means to input instructions to the microprocessor.

14. A device, as in claim 13, further comprising:
a grill; and
a gas supply.
15. A device, as in claim 14, further comprising:
a grill temperature probe having an output which indicates the temperature inside a grill, the output of the grill temperature sensor is input to the microprocessor;
the microprocessor having means to control the internal temperature of the grill or the cooking time based on the temperature detected by the grill temperature probe.
16. A device, as in claim 15, further comprising:
a food temperature probe having an output which indicates the temperature of food inside a grill, the output of the food temperature probe is input to the microprocessor;
the microprocessor having means to control the internal temperature of the grill or the cooking time based on the temperature detected by the food temperature probe.
17. A device, as in claim 1, wherein the grill is a kitchen stove.
18. A device, as in claim 17, wherein the activity sensor further comprises an vibration sensor.
19. A device, as in claim 17, wherein the activity sensor further comprises an oven door motion detector.
20. A device, as in claim 19, further comprising:
an alarm attached to the microprocessor;
the microprocessor having means to activate the alarm prior to shut off of the grill.

* * * * *